United States Patent [19]

Galloway et al.

[11] Patent Number: 5,193,054
[45] Date of Patent: Mar. 9, 1993

[54] DC CONTENT CONTROL IN A DUAL VSCF CONVERTER SYSTEM

[75] Inventors: Gary L. Galloway, Rockford; Thomas S. Latos, Huntley; Derrick Roe, Rockford, all of Ill.

[73] Assignee: Sundstrand Corporation, Rockford, Ill.

[21] Appl. No.: 781,920

[22] Filed: Oct. 24, 1991

[51] Int. Cl.$^5$ .............................................. H02M 7/48
[52] U.S. Cl. ........................................ 363/72; 363/65; 307/82
[58] Field of Search ................ 363/65, 71, 72; 307/82

[56] References Cited

U.S. PATENT DOCUMENTS

| | | | |
|---|---|---|---|
| 3,943,429 | 3/1976 | Heintze | 321/26 |
| 3,979,662 | 9/1976 | Klein | 321/27 |
| 4,052,658 | 10/1977 | Hucker | 363/43 |
| 4,149,233 | 4/1979 | Nagano | 363/71 |
| 4,405,976 | 9/1983 | Mitchell et al. | 363/72 |
| 4,529,925 | 7/1985 | Tanaka et al. | 363/161 |
| 4,677,535 | 6/1987 | Kawabata et al. | 363/65 |
| 4,748,340 | 5/1988 | Schmidt | 363/71 |
| 4,764,859 | 8/1988 | Matsui et al. | 363/161 |
| 4,802,079 | 1/1989 | Mizoguchi | 363/71 |
| 4,882,120 | 11/1989 | Roe et al. | 363/98 |
| 4,947,310 | 8/1990 | Kawabata et al. | 363/71 |
| 5,036,452 | 7/1991 | Loftus | 307/82 |

Primary Examiner—Steven L. Stephan
Assistant Examiner—Jeffrey Sterrett
Attorney, Agent, or Firm—Wood, Phillips, Van Santen, Hoffman & Ertel

[57] ABSTRACT

The problem of minimizing DC content in a dual converter system (18) is addressed with dual inverters (36,38) having outputs connected in parallel through an interphase transformer (42). The outputs for each phase are connected through a neutral forming transformer (43) to develop a reference. The output voltage at each phase is sensed, filtered and averaged to develop a signal representing DC content in each of the output phase voltages. A master controller (40-1) develops switching signals for the master inverter (36) which signals are modified based on the DC content of the output phase voltages to minimize the same. A current transducer (44) for each phase senses differential current output from the master and slave inverters (36 and 38) for each phase. This signal is used to modify PWM patterns from a slave controller (40-2) for minimizing DC content through the interphase transformers (42).

14 Claims, 3 Drawing Sheets

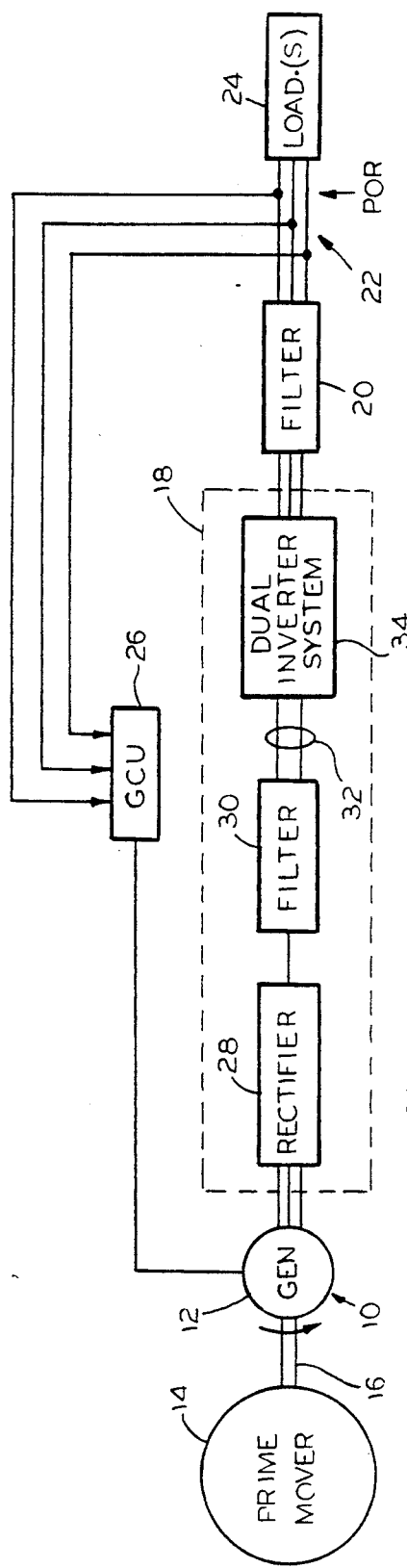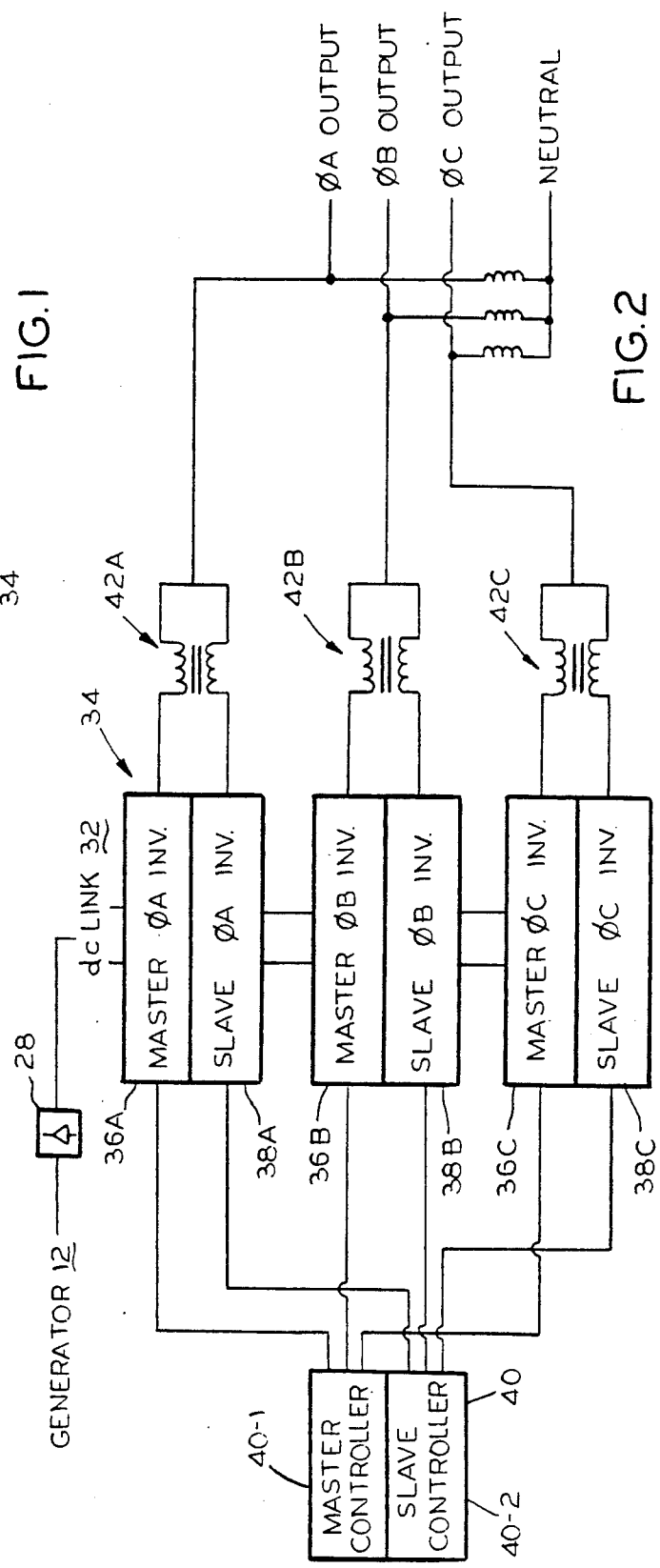

DC CONTENT CONTROL IN A DUAL VSCF CONVERTER SYSTEM

FIELD OF THE INVENTION

This invention relates to electrical power systems and, more particularly, to a control for limiting DC content in a dual converter VSCF system.

BACKGROUND OF THE INVENTION

Conventional electrical power systems utilize a synchronous electrical generator for generating AC power. Such a generator may include a rotor and a stator having a stator coil. In applications such as an aircraft, the rotor is driven by an engine such that electrical power is developed in the stator coil. Owing to the variation in engine speed, the frequency of the power developed in the generator winding is similarly variable. This variable frequency power is converted to constant frequency power using a variable speed constant frequency (VSCF) system including a power converter which may develop, for example, 115/200 $V_{AC}$ power at 400 Hz.

A typical converter includes an AC to DC converter, such as a rectifier, connectable through a DC link having a filter to a DC to AC converter, such as an inverter. The output of the inverter comprises constant frequency power which is applied through a high frequency filter to an AC bus. Typically, the converter is controlled by a pulse width modulation (PWM) control signal to focus energy at the fundamental frequency and to suppress harmonics. The number of harmonics controllable is a function of switching frequency. However, loss is also proportional to switching frequency. Therefore, it is necessary to limit the number of pulses on any given switch. Typically, seven pulses are used, one to control the magnitude at the fundamental frequency and the others to control six harmonics. With a single inverter, this eliminates the third through thirteenth harmonics. A high frequency filter is used to reduce the higher harmonics. However, it is desirable to minimize the filter size.

Higher power requirements cannot always be met with a conventional power system. In certain applications, dual, parallel parts may be used. For example, dual inverters controlled identically may be connected in parallel. Ideally, the dual inverters are controlled so that loading is split equally between the two. For connection of the same in parallel, the corresponding phase outputs of each may be connected through an interphase transformer. With an interphase transformer, if the DC component on each inverter output is unequal, then a DC current flows through the interphase transformer. The amount of magnetic flux swing changes as a result of this current. Therefore, it is desirable to eliminate the DC current flowing through the interphase transformer.

With respect to converter output, aircraft specifications generally require a reference. A neutral forming transformer comprises a load of star configuration in hard parallel with the output to form a neutral.

Any non-ideal characteristics of any of the inverter, the filter or the load produces DC offsets within the converter system. These offsets cause DC current to flow, with the current amount being related to DC voltage levels. The magnetic design of the interphase transformers and the neutral forming transformer are a function of DC content in the inverter output. This results in a heavier, more inefficient and larger design, all of which are undesirable in aircraft applications.

The present invention is intended to overcome one or more of the problems as set forth above.

SUMMARY OF THE INVENTION

In accordance with the present invention, a dual inverter system is controlled using a master and slave control scheme to minimize DC content in the inverter system output.

Broadly, there is disclosed herein a control in a polyphase electric power system with dual inverters having common phase outputs connected in parallel to inductive elements for connection to a load. The control comprises first sensing means for sensing per phase output power from the inductive elements and a second sensing means operatively associated with the outputs of both inverters for each phase for sensing differential current from the inverters for such phase. An inverter control is connected to the first and second sensing means including first control means for developing pulse width modulated control signals to one of the inverters in response to the first sensing means to control output power and second control means for developing pulse width modulated control signals to the other inverter to reduce differential current sensed by the second sensing means.

It is a feature of the invention that the second sensing means comprises a current transformer for each phase sensing output from one inverter differentially from that of the other inverter.

It is another feature of the invention that a filter circuit is connected between the current transformer and the inverter control, the filter developing a signal proportional to DC current flowing through the inductive element.

It is a further feature of the invention that the inverter control modifies the pulse width modulated control signals to minimize DC current flowing through the inductive element.

It is still another feature of the invention that the first sensing means comprises a voltage sensor for each phase for sensing of the associated output phase voltage.

It is still an additional feature of the invention that a filter circuit is connected between the voltage sensor and the inverter control, the filter developing a signal proportional to DC content of the output phase voltage.

It is still another feature of the invention that the inverter control modifies the pulse width modulated control signals to minimize DC voltage of the output phase voltage.

In accordance with another aspect of the invention there is disclosed a DC content control for dual pulse width modulated polyphase inverters having phase outputs connected in parallel to interphase transformers connected to a neutral forming transformer for connection to a load. The control comprises voltage sensing means for sensing per phase output voltage from the neutral forming transformer. A current transducer means in operatively associated with the outputs of both inverters for each phase for sensing DC current flowing in the associated interphase transformer. An inverter control is connected at the voltage sensing means in the current transducer means including master control means for developing pulse width modulated control signals to one converter in response to the voltage sensing means to control output power and slave control means for developing pulse width modulated control signals to the other inverter in response to the current transducer means to reduce current flowing in the interphase transformers.

More particularly, the disclosed invention relates to a polyphase electric power system with dual inverters having common phase outputs connected in parallel to interphase transformers for connection to a load. The inverters are configured as a master inverter and a slave inverter. A neutral forming transformer is connected to the phase outputs to develop neutral reference. The output voltage at each phase is sensed relative to the neutral, filtered and averaged to develop a signal representing DC content in each of the output phase voltages. A pulse width modulation (PWM) controller develops switching signals for the master inverter which such signals are modified based on the DC content of the output phase voltages to minimize the same. A current transducer for each phase senses differential current output from the master and slave inverters for each phase. This signal is filtered and averaged and used to modify the PWM patterns to the slave inverter for minimizing DC content in the interphase transformers.

Further features and advantages of the invention will readily be apparent from the specification and from the drawings.

BRIEF DESCRIPTION OF THE DRAWING

FIG. 1 is a block diagram of a VSCF system incorporating the control of the present invention;

FIG. 2 is a combined schematic and block diagram of the dual inverter system of FIG. 1 in a conventional form;

DETAILED DESCRIPTION OF THE INVENTION

Figure 3:
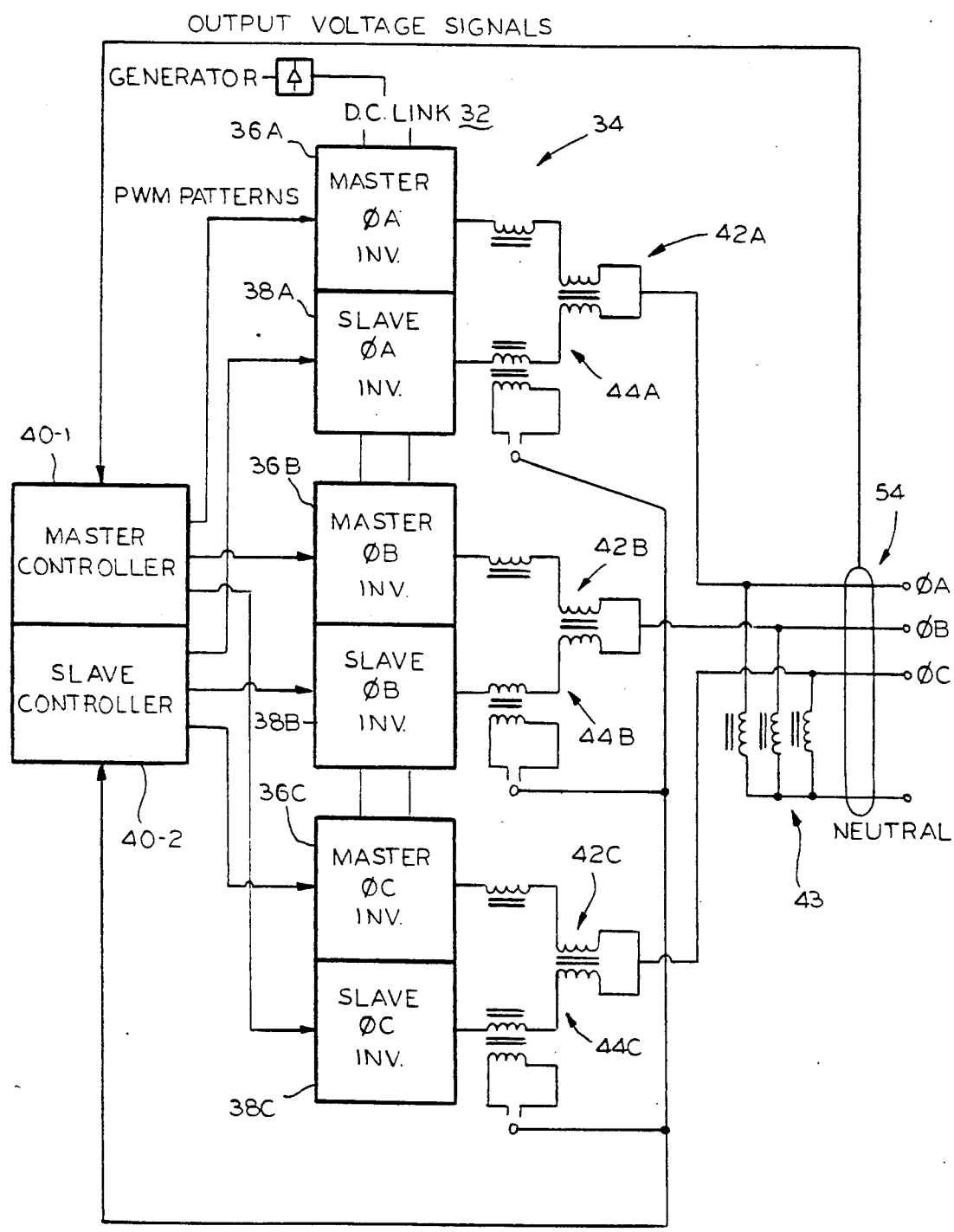
FIG. 3 is a combined schematic and block diagram of the dual inverter system of FIG. 1 in accordance with the invention.

Referring first to FIG. 1, an electrical power system 10 includes a generator 12 driven by a prime mover 14 via a shaft 16. Although not shown, the generator 12 includes a permanent magnet generator, an exciter and a main generator all driven by the prime mover 14 through the shaft 16.

The generator 12 develops polyphase output power which is delivered to a converter 18. The converter 18 develops constant frequency power which is coupled through a high frequency filter 20 to an AC bus 22 for powering loads, represented typically at 24.

In a typical application, the prime mover 14 is the main engine in an aircraft, and the converter 18 is part of a variable speed constant frequency (VSCF) system for delivering constant frequency power to the AC bus 22 for powering aircraft loads 24, as controlled by a generator control unit 26.

The converter 18 includes an AC/DC converter 28 connected through a DC filter 30 and DC link 32 to a DC/AC converter 34. Particularly, according to the illustrated embodiment of the invention, the AC/DC converter 28 comprises a full wave bridge rectifier circuit of conventional construction which is operable to convert three-phase AC power to DC power. The DC/AC converter 34 comprises a dual inverter system comprising dual pulse width modulation (PWM) inverter circuits, as discussed below.

With reference also to FIG. 2, the dual inverter system 34 in one known form is illustrated. The inverter system 34 includes a master inverter 36 consisting of portions 36A, 36B and 36C for each of three phases, and a slave inverter 38 consisting of portion 38A, 38B and 38C for each of the three phases.

For a thorough understanding of the invention, the inverter system 34 is illustrated in FIGS. 2 and 3 with circuit elements portions for each phase shown separately and including the suffix A, B or C relative to each such phase. In fact, the circuit elements for each phase are identical and are illustrated in greater detail in FIGS. 4 and 5 for a single phase. For discussion of FIGS. 4 and 5, which are generic to any one phase, the suffixes A, B or C are omitted. For example, the master inverter is referred to generically with the reference numeral 36, it being understand that the master inverter 36 consists of individual circuit portions for phase A, labeled 36A, phase B labeled 36B, and phase C labeled 36C.

The inverters 36 and 38 may take one of many known forms. For example, the inverters 36 and 38 may comprise voltage source inverters having six power switches connected in a three-phase bridge configuration for the phases A, B and C. Each of the power switches receives pulse width modulated (PWM) base drive commands from an inverter controller 40 to control the output voltage of the inverters 36 and 38 by varying the duty cycle of the PWM signals. The DC voltage supply to the inverters 36 and 38 comprises the DC voltage on the DC link 32.

The inverter controller 40 comprises a master controller 40-1 for developing base drive signals to the master inverter portions 36A-36C. Similarly, a slave controller 40-2 develops base drive signals to the slave inverter portions 38A-38C.

Each phase of the inverters 36 and 38 is connected in parallel through an inductive element 42 comprising an interphase transformer. For example, outputs from the master phase A inverter portion 36A and slave phase A inverter portion 38A are connected to an interphase transformer 42A. Similar interphase transformers 42B and 42C are provided for the phases B and C, respectively.

Non-ideal switching characteristics in the inverters 36 and 38 cause a DC potential to develop across the interphase transformers 42. A DC potential causes a DC current to flow. This DC current is limited only by the resistance of the interphase transformers 42. The DC current sums with the developed AC current, which increases power losses in the inverters 36 and 38 and in the interphase transformers 42. The DC current also causes a bias flux on the core of the interphase transformers 42.

The total flux excursion available on each interphase transformer 42 is a fixed number limited by the type of magnetic material used in winding the same. Because part of the flux excursion must be used for flux caused by DC current, the resulting magnetic design of the interphase transformers 42A-42C must be larger, more inefficient and heavier as the DC voltage/current increases. The current rating of the inverters 36 and 38 must also be increased to compensate for the DC current flowing on top of the normal AC current, resulting in the inverter design being larger, more inefficient and heavier as the DC voltage and current increases.

In certain applications, it is necessary to have an output voltage reference. To accomplish this, a star configuration load in the form of a neutral forming transformer 43 is connected in hard parallel with the inverter outputs. The neutral can be used as a reference for sensing output voltage on each of the three phases.

The DC potentials discussed above can also cause DC current to flow in the neutral forming transformer 43. As above, the neutral forming transformer 43 must be designed to handle such current.

The DC content in the output from the inverters 36 and 38 is controlled by using a master/slave control scheme. Particularly, and with reference to FIG. 3, a current transducer 44A, 44B and 44C for each of the phases senses the primary currents for each phase differentially. As further illustrated in FIGS. 4 and 5, each current transducer 44 comprises a current transformer 46 in the form of a ring through which the output from the slave inverter 38 passes directly and the output from the master inverter 36 passes oppositely prior to connection to the interphase transformer 42. By differentially sensing the currents, the load current is removed from the resultant sensed value. The remaining currents are the interphase transformer excitation current and the DC current flowing in the interphase transformer 42. Indeed, the resulting current sensed by the current transducer 44 is equal to twice the interphase transformer excitation current summed with twice the DC current flowing through the interphase transformer 42.

Figure 4:
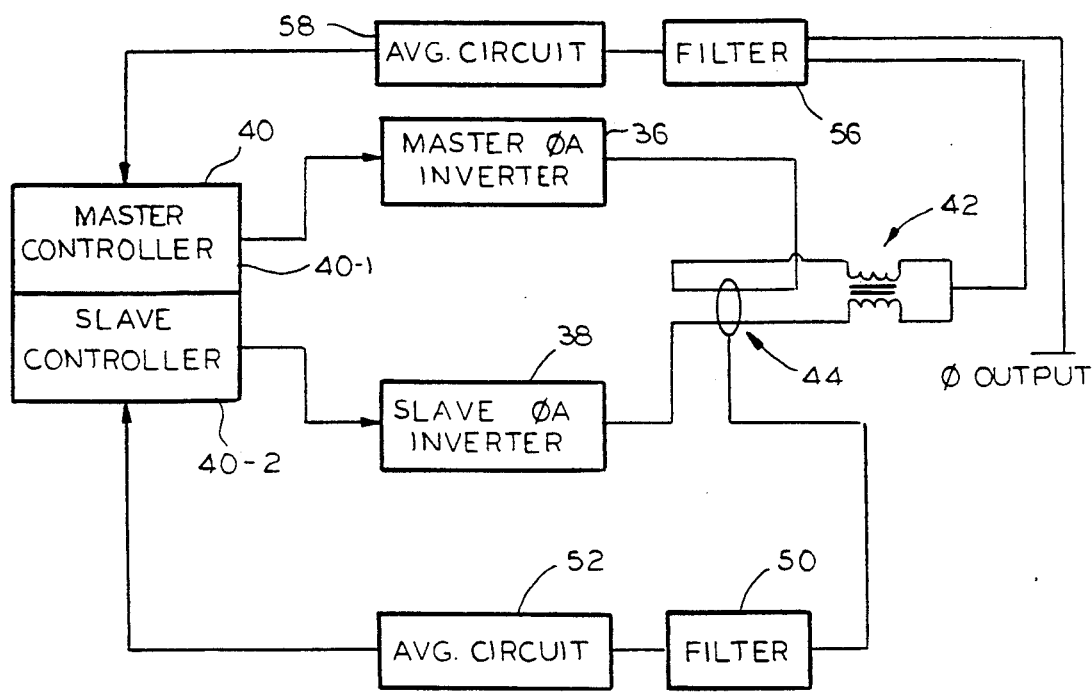
FIG. 4 is a combined schematic and block diagram of the dual inverter system of FIG. 3 in greater detail for a single phase output.
Figure 5:
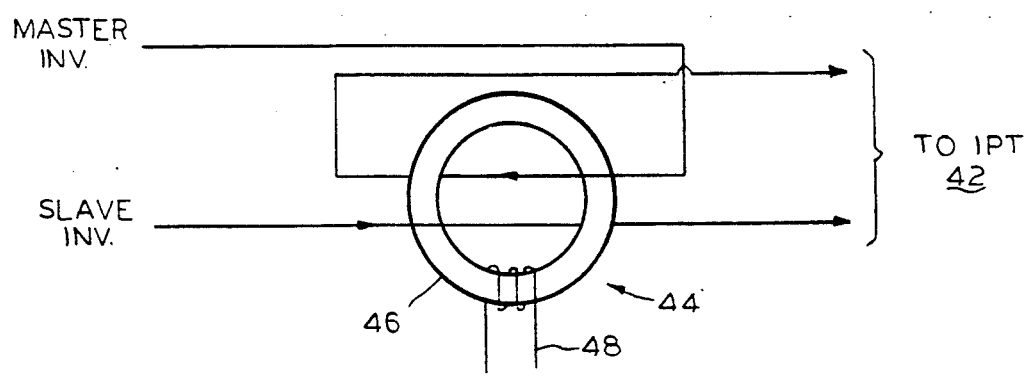
FIG. 5 is a schematic diagram illustrating connection of a current transformer for sensing differential current from the dual inverter system of FIG. 4.

The differential current through the current transformer 46 is sensed by a winding 48, see FIG. 5, connected to a filter circuit 50, see FIG. 4. The filter circuit 50 strips the AC content from the sensed circuit to develop a signal proportional to the DC signal flowing through the interphase transformer 42. The output of the filter circuit 50 is coupled through an averaging circuit 52 to the slave controller 40-2. The averaging circuit 52 stabilizes the output from the filter circuit 50.

With reference again to FIG. 3, a voltage sensing circuit 54 is provided for sensing per phase output voltage in the form of output voltage from the interphase transformers 42A-42C. Particularly, for each phase, the output voltage is sensed relative to the neutral formed by the neutral forming transformer 43. With reference again to FIG. 4, each phase output and the neutral are connected to a filter circuit 56. The filter circuit strips the AC content from the sensed phase voltage to develop a signal proportional to the DC content of the output phase voltage. The output of the filter circuit 56 is coupled through an averaging circuit 58 to the master controller 40-1. The averaging circuit 58 stabilizes the output from the filter circuit 56.

The master controller 40-1 develops base drive signals to the master inverter phase portions 36A-36C. Similarly, the slave controller develops base drive signals to the slave inverter portions 38A-38C. The master controller 40-1 modifies the base drive signals in accordance with the signals received from the averaging circuit 58 for each phase to minimize DC content. Similarly, the slave controller 40-2 modifies its base drive signals in accordance with the signals from the averaging circuit 52 for each phase to minimize DC content. Each of the master controller 40-1 and slave controller 40-2 may include an inverter control circuit such as shown and described in Roe et al, U.S. Pat. No. 4,882,120, owned by the assignee hereof, the specification of which is hereby incorporated by reference herein. This patent discloses an inverter control for minimizing DC content as by dithering the inverter base drive signals to modify the PWM patterns.

The modification of the base drive signals by the master controller 40-1 minimizes DC voltage content at the neutral forming transformer 43. The non-ideal characteristics that cause the DC voltages are of a nature that they do not occur immediately and are considered to be relatively slow. As a result, the response of the neutral forming transformer control loop from the master controller 40-1 may be slow in nature. Also, controlling the DC content of the neutral forming transformer 43 does not guarantee minimization of the DC content of the interphase transformers 42. This DC content is controlled by the slave controller 40-2. Thus, as the slow neutral forming transformer loop is controlled by the master controller 40-1, the faster interphase transformer loops are controlled by the slave controller tracking the neutral forming transformer loop.

Thus, using the disclosed concept incorporating the master controller 40-1 for the neutral forming transformer loop with the slave controller 40-2 for the interphase transformer loop, the interphase transformers 42, the neutral forming transformer 43 and the inverters 36 and 38 can be designed to be smaller, more efficient and lighter than can be obtained without such control.

The disclosed embodiment of the invention illustrates the broad inventive concepts to provide reduced DC content.

We claim:

1. In a polyphase electric power system with first and second inverters having common phase outputs connected in parallel to inductive elements for connection to a load, a control comprising:
    a first sensing means for sensing per phase output voltage from said inductive elements;
    a second sensing means operatively associated with the outputs of both inverters for each phase for sensing differential current from said inverters for such phase; and
    an inverter control connected to said first and second sensing means including first control means for developing pulse width modulated control signals to said first inverter in response to said first sensing means to control output voltage and second control means for developing pulse width modulated control signals to said second inverter to reduce differential current sensed by said second sensing means.

2. The control of claim 1 wherein said second sensing means comprises a current transformer for each said phase sensing output from said first inverter differentially from that of said second inverter.

3. The control of claim 2 further comprising a filter circuit connected between said current transformer and the inverter control, said filter developing a signal proportional to DC current flowing through the inductive element.

4. The control of claim 3 wherein said inverter control modifies the pulse width modulated control signals to minimize DC current flowing through the inductive element.

5. The control of claim 1 wherein said first sensing means comprises a voltage sensor for each phase for sensing of the associated output phase voltage.

6. The control of claim 5 further comprising a filter circuit connected between said voltage sensor and the inverter control, said filter developing a signal proportional to DC content of the output phase voltage.

7. The control of claim 6 wherein said inverter control modifies the pulse width modulated control signals to minimize DC voltage of the output phase voltage.

8. A DC content control for dual pulse width modulated polyphase inverters having phase outputs connected in parallel to interphase transformers connected to a neutral forming transformer for connection to a load, comprising:
  voltage sensing means for sensing per phase output voltage from the neutral forming transformer;
  current transducer means operatively associated with the outputs of both inverters for each phase for sensing DC current flowing in the associated interphase transformer; and
  an inverter control connected to said voltage sensing means and said current transducer means including master control means for developing pulse width modulated control signals to one said inverter in response to said voltage sensing means to control output power and slave control means for developing pulse width modulated control signals to the other said inverter in response to said current transducer means to reduce current flowing in the interphase transformers.

9. The control of claim 8 wherein said current transducer means comprises a current transformer for each said phase sensing output from one inverter differentially from that of the other inverter.

10. The control of claim 9 further comprising a filter circuit connected between each said current transformer and the inverter control, each said filter developing a signal proportional to DC current flowing through the connected interphase transformer.

11. The control of claim 10 wherein said inverter control modifies the pulse width modulated control signals to minimize DC current flowing through the interphase transformer.

12. The control of claim 8 wherein said voltage sensing means comprises a voltage sensor for each phase for sensing of the associated output phase voltage.

13. The control of claim 12 further comprising a filter circuit connected between each said voltage sensor and the inverter control, each said filter developing a signal proportional to DC content of the output phase voltage.

14. The control of claim 13 wherein said inverter control modifies the pulse width modulated control signals to minimize DC voltage of the output phase voltage.

* * * * *